Patented Apr. 1, 1941

2,237,087

UNITED STATES PATENT OFFICE 2,237,087

PROCESS OF TREATING EGG WHITES

Verne D. Littlefield, Beverly Hills, Calif., and Norman C. Fischer, Springfield, Mo., assignors to Armour and Company, Chicago, Ill., a corporation of Illinois No Drawing. Application July 14, 1938,
Serial No. 219,280

8 Claims. (Cl. 99—210)

This invention relates to processes of treating egg whites, and it comprises processes wherein liquid egg whites, which can be liquid egg whites as initially obtained from the shell, strained raw egg whites, thawed frozen egg whites, or the separated thick and thin portions of egg white, are acidified at moderately elevated temperatures of between 100° F. and 140° F., for a short period of time, the thus acidified egg white strained, and then dried; it further comprises processes wherein the egg white thus acidified is neutralized before drying; and it further comprises processes wherein the egg white is acidified to a pH value of 5.5 to 5.8 at the temperatures stated.

In the processing of liquid egg whites for the preparation of a dried material it is customary to subject the whites to a preliminary treatment for the purpose of improving the characteristics of the dried product ultimately obtained.

Treatment processes prior to drying have generally been of two types. In the first, the liquid egg whites are allowed to ferment in large vats over a period of many hours, and the lower layer of whites decanted from a rather thick voluminous scum of insoluble material. Fermentation inevitably results in an increase in the acidity of the egg whites so that much protein matter is thrown out of solution and collects as a scum on the surface of the body of egg whites. These fermentation processes have disadvantages, chief among them being the fact that the dried product has an objectionable odor. Others have described various ways of speeding up the fermentation reaction by the addition of acid as shown, for example, in Rosner U. S. Patent 2,059,399. In this patent the egg whites are acidified to a pH of between 5 and 6 and held for a period of about twenty-four hours at room temperature. In the second type of process prior workers have attempted to avoid fermentation entirely as, for example, by acidifying to a pH of about 5.2 and drying.

In the Littlefield U. S. Patent No. 2,191,257, there is described a process of treating egg white, the essential gist of which is in the acidification of the egg whites to closely regulated values such that the pH is from 5.5 to 5.8. That application points out that at these pH values undesirable protein material is rendered flocculent without, however, throwing out of solution certain valuable foam stabilizing agents which contribute to the foam stability of foams made from the dried whites. That application teaches the desirability of acidifying the egg whites at temperatures generally below room temperature in order to prevent any substantial degree of fermentation. The object of this is to give a dried product which is substantially free of any fermentation odor or other characteristics indicative of bacterial decomposition. That application also advocates the use of low temperatures so that bacterial decomposition or fermentation will not occur to any substantial degree during the time the acidified eggs are held in large vats to permit flocculation and the formation of a strainable insoluble floc.

In a further Littlefield U. S. Patent No. 2,189,380, there is described ways of preparing a substantially pure egg albumin. The processes therein disclosed consist in acidifying the egg albumin to a pH of about 4.5 to 5, this resulting in a flocculation of most of the undesirable protein material. Here again there is advocated the use of relatively low temperatures, about 45° F. to 70° F.

Both of these co-pending processes yield products free of any fermentation odor and eminently satisfactory for the purposes intended.

We have now discovered that these "acidification-type" egg white treatment processes can be speeded up provided relatively higher temperatures are used. Contrary to the general belief in the art, we find that temperatures as high as 140° F. just below the coagulation point of the albumin, will not result in any substantial amount of fermentation provided the temperature is so correlated with the time of holding at this temperature that insufficient time for fermentation is allowed. The process of the present invention is based largely on the discovery that at temperatures of 100° F. to 140° F. the viscosity of the whites decreases so markedly that the flocculent precipitate resulting from acidification settles and flocculates in so short a period of time that the flocculent material can be strained or filtered from the whites before any fermentation occurs. When operating at low temperatures, 70° F. or below, the viscosity of the whites is appreciably greater and flocculation to give a strainable insoluble mass takes longer, but fermentation is inhibited during this relatively longer holding time by keeping the mixture at a low temperature.

In contrast to this the present invention operates at much higher temperatures but the holding period allowing for flocculation to occur is very much less. Consequently, insufficient time is given, at the raised temperature, for any substantial degree of fermentation to occur.

Moreover, acidification at the temperatures of the present invention results in a more rapid flocculation of undesirable proteins. This is probably because the action of the acid is faster at the elevated temperatures we use.

In broad aspects then, our invention comprises the acidification of a liquid egg white material at moderately elevated temperatures, the lowermost of which is not substantially below 100° F., going up to just below the coagulation point of the albumin itself. This is coupled with straining or filtration of the flocculent insoluble mass, or decanting the clear liquid therefrom and thereafter drying the treated liquid egg whites. As additional steps, we can cool the acidified and strained egg white if for any reason it is desired to hold the treated egg white in vats for any substantial length of time prior to subsequent operations. Or, after acidification and either before or after straining, we can neutralize the acidified egg white. Neutralization is generally effected after the flocculent precipitate has been strained from the substantially clear acidified white since otherwise some of the flocculent material may be returned to solution.

Although others have acidified egg whites to a temperature as high as 80° F., we know of no instance where flocculent material thus thrown out of solution has been separated from the white prior to drying or other subsequent treatment.

The processes of the present invention are equally applicable to the treatment of raw liquid egg whites as they come from the egg, strained raw liquid egg whites from which chalazae, dirt and bits of shell have been removed by simple straining prior to treatment, thawed frozen liquid egg whites, an article of commerce, and the treatment of the thick or thin portions of the egg white separately.

Likewise, the processes of the present invention are not restricted to the acidification of the egg whites to any particular pH value. When we wish to prepare a dried egg white material having superior whipping characteristics for use in the edible foods industry it is advantageous to acidify the whites to a pH of about 5.5 to 5.8 in the warm, namely temperatures of about 100° F. to 140° F., separate the flocculent material before any substantial fermentation has occurred, and then dry the whites. When we wish to make a highly purified albumin in accordance, for instance, with the process described in the U. S. Patent No. 2,189,380 referred to above, we acidify the whites to a pH of about 4.5 to 5 at the temperature stated, namely 100° F. to about 140° F., separate off the flocculent material and dry.

Thus the principles of the present invention are applicable to the preparation of any kind of dried egg albumin product, but in general acidification to pH values of between 4.5 and 6 is employed.

When, for example, we wish to make a dried egg white especially useful in the edible food industries we add dilute hydrochloric acid rather quickly, with agitation, to a large vat of egg whites maintained at a temperature of about 120° F. Flocculation occurs almost at once and as soon as agitation is stopped the flocculent material settles so that the clarified whites can be immediately decanted. Alternatively the stream of egg whites coming from the egg cracking room can be passed through a coil-type heater just warm enough to raise the egg whites to the temperature stated. As the warm egg whites discharge into the vat a small stream of dilute acid can be also fed in. Any suitable acid commonly used in the acidification of egg whites can, of course, be employed. Hydrochloric acid is the preferred acid but organic acids, such as tartaric, citric and others are useful. In this example, sufficient acid is added so that the batch of egg whites has a pH of 5.5 to 5.8.

Because of the use of moderately elevated temperatures which, as stated above, speed up the flocculating reaction and also the physical agglomeration of the flocculent material, no holding period is necessary, and the entire process of acidification is completed approximately by the time the last quantities of acid have been added. This is in contradistinction to most acidification processes where the acidified egg white is held for varying periods of time until flocculation has been completed.

After flocculation is completed at the temperature stated we then draw off the acidified white from the vat. A simple strainer can be used at this stage if necessary, and one advantage of our process is that the character of the floc which may collect on the strainer is such that no clogging is observed. The strainer primarily strains out any suspended broken bits of shell, chalazae and any remaining floc which has not settled.

The warm, clarified egg whites can then be pumped direct to drying apparatus, such as a spray-drier or to pan driers commonly used in the art. During the drying hydrochloric acid is evolved as a vapor and that is one reason why hydrochloric acid is more generally used in the art than other acids. If for any reason we wish to hold the acidified egg whites for any length of time prior to drying, it is best to cool them to a temperature below that at which fermentation would occur. The egg whites can, for example, be drawn off the vat and sent through a pipe cooler on their way to a holding tank where they can be cooled to temperatures of about 50° F. or below.

When non-volatile acids, such as tartaric, are used for acidification, it is advantageous to neutralize the acidified egg whites by the addition of a neutralizing agent, such as sodium hydroxide, ammonium hydroxide, or other similar substances such as basic sodium phosphate or other buffers. This neutralization is best performed on the egg whites after they have been withdrawn from the vat, since then no insoluble material insoluble at a pH of 5.5 to 5.8 returns to solution. The neutralized whites can be filtered before drying.

Dried egg whites made in accordance with the above examples, have superior whipping characteristics and yield stable foams of good volume. It is an observed fact that dried egg whites improve in whipping characteristics if they are allowed to age in bulk containers. We find that egg whites made in accordance with the present invention have better aging characteristics in that shorter aging periods can be used.

When we wish to make substantially pure egg albumin, as described, for example, in the U. S. Patent No. 2,189,380, we follow the exact procedure indicated in the above example with the exception that we acidify the raw egg whites to a pH of about 4.5 to 5. This results in a precipitation of practically all undesirable proteins other than the egg albumin itself. Flocculation is complete within a few minutes after all of the acid has been added, no long holding time is necessary, and the acidified egg white can be immediately decanted and dried.

Having thus described our invention, what we claim is:

1. In the process of acidifying liquid egg white materials preliminary to drying, the steps comprising acidifying the egg white material at a temperature of not less than about 100° F. but below the coagulation temperature of the egg white material, the egg white material being acidified to a pH of between 5.5 and 5.8.

2. In the process of acidifying liquid egg white materials preliminary to drying, the step comprising acidifying the material at a temperature of about 100° F. to about 140° F., the egg white material being acidified to a pH of between 5.5 and 5.8.

3. The process of preparing a dried egg white material which comprises acidifying the material to a pH of between about 4.5 and 6 at a temperature of not less than about 100° F. but below the coagulation temperature of the material and at a pressure at least as high as atmospheric, separating insoluble products thus formed, and drying the acidified egg white materials before any substantial fermentation occurs therein, and before their pH has returned to normal.

4. The process of preparing a dried egg white which comprises acidifying liquid egg white to a pH of between 4.5 and 6 at a temperature of not less than about 100° F. but below the coagulation temperature of the whites and at a pressure at least as high as atmospheric, separating flocculated materials from the whites before any substantial fermentation occurs therein, adding a neutralizing agent to the whites, and drying the whites.

5. The process as in claim 3 wherein the pH of the liquid whites after acidification is about 5.5 to 5.8.

6. The process as in claim 4 wherein the pH of the liquid whites after acidification is about 5.5 to 5.8.

7. The process of preparing dried egg whites which comprises acidifying liquid egg whites to a pH of between 5.5 and 5.8 at a temperature of 100° F. to 140° F., separating flocculated materials from the whites before any substantial fermentation occurs therein, adding a neutralizing agent to the whites, and drying the whites.

8. The process of preparing dried egg whites which comprises acidifying liquid egg whites to a pH between 5.5 and 5.8, at a temperature of about 100° F. to 140° F., separating flocculated materials therefrom before any substantial fermentation has occurred therein, cooling the egg whites to a temperature below the fermentation temperature, and drying the whites.

VERNE D. LITTLEFIELD.
NORMAN C. FISCHER.